(12) United States Patent
Nobileau

(10) Patent No.: US 12,606,964 B2
(45) Date of Patent: Apr. 21, 2026

(54) HIGHLY AUTOMATED MODE OF ROAD TRAFFIC

(71) Applicant: Philippe Nobileau, Villefranche sur Mer (FR)

(72) Inventor: Philippe Nobileau, Villefranche sur Mer (FR)

( * ) Notice: Subject to any disclaimer, the term of this patent is extended or adjusted under 35 U.S.C. 154(b) by 815 days.

(21) Appl. No.: 17/904,128

(22) PCT Filed: Feb. 12, 2021

(86) PCT No.: PCT/IB2021/051187
§ 371 (c)(1),
(2) Date: Aug. 12, 2022

(87) PCT Pub. No.: WO2021/161247
PCT Pub. Date: Aug. 19, 2021

(65) Prior Publication Data
US 2023/0063561 A1 Mar. 2, 2023

(30) Foreign Application Priority Data

Feb. 14, 2020 (FR) ...................................... 2001473

(51) Int. Cl.
*E01C 9/02* (2006.01)
*B60F 1/00* (2006.01)
(Continued)

(52) U.S. Cl.
CPC .................. *E01C 9/02* (2013.01); *B60F 1/00* (2013.01); *B60L 5/39* (2013.01); *B60M 1/34* (2013.01); *B62D 1/265* (2013.01); *E01B 25/28* (2013.01)

(58) Field of Classification Search
CPC ..... E01C 9/02; E01C 1/04; E01C 9/06; E01C 1/002; B60F 1/00; B60L 5/39;
(Continued)

(56) References Cited

U.S. PATENT DOCUMENTS 712,541 A * 11/1902 Jaques ...................... E01C 9/02
404/17
902,073 A * 10/1908 Gueritey ................ B62D 1/265
104/245
(Continued)

FOREIGN PATENT DOCUMENTS

WO WO-9426573 A1 * 11/1994 ............. B62D 1/265

*Primary Examiner* — Cheng Lin

(57) ABSTRACT

Disclosed is a traffic system and method for motor vehicles (F), comprising, on the side of a traffic lane (12b, 12c), a dedicated track (21) in the form of a "U"-shaped gutter receiving, in a highly automated driving mode, one of the side wheel assemblies (16) of a vehicle, and comprising: • a running surface (22) substantially parallel to the surface of the roadway of the traffic lane (12b, 12c), • two side surfaces (23, 31) located on either side and above the running surface (22), one external (23) and the other internal (31) with respect to the footprint of the vehicle (F), the side surfaces (23, 31) being substantially perpendicular to the running surface (22), the internal side surface (31) maintaining the current ground clearance of the motor vehicles, wherein the side surfaces (23, 31) of the track are substantially continuous longitudinally and in that the system comprises a means for crossing the internal side surface (31) by lateral movement of the side wheels assembly (16) at sustained speed.

7 Claims, 9 Drawing Sheets

(51) Int. Cl.
| | |
|---|---|
| *B60L 5/39* | (2006.01) |
| *B60M 1/34* | (2006.01) |
| *B62D 1/26* | (2006.01) |
| *E01B 25/28* | (2006.01) |

(58) Field of Classification Search
CPC ..... B60L 2200/26; B62D 1/265; E01B 25/28; B60M 1/34
See application file for complete search history.

(56) References Cited

U.S. PATENT DOCUMENTS

| | | | | | |
|---|---|---|---|---|---|
| 1,118,853 | A | * | 11/1914 | Goodell .................... | E01C 9/02 238/5 |
| 1,288,664 | A | * | 12/1918 | O'Rourke ................ | E01C 9/02 238/5 |
| 2009/0320713 | A1 | * | 12/2009 | Amiri ..................... | B61D 1/02 280/1 |

* cited by examiner

HIGHLY AUTOMATED MODE OF ROAD TRAFFIC

The present invention relates to a bimodal, preferably electrically powered, traffic system, in which one driving mode is conventionally controlled by the driver, and the other is a secure highly automated traffic mode, comprising:

a high-speed, pseudo-level 4 highly automated driving mode (without requiring the driver's constant vigilance), which only demands automotive-level reliability thanks to mechanical backup guidance in emergency mode, for example in case of failure of the highly automated driving system;

dynamic charging of electric or hybrid vehicles with very low voltage and medium power;

the possibility of platooning to increase traffic capacity without widening the roadway, with risks mitigated by emergency braking independent of tire-to-road adhesion, and triggered by inertia in case of failure of the brake control system, as described in the Applicant's earlier publication WO 94/26573.

The deployment of autonomous traffic in motor vehicles currently faces legal challenges because liability for accidents shifts from the driver to the manufacturer (and its suppliers). Indeed, most traffic accidents today are caused by human error, with the driver being primarily responsible.

All existing autonomous vehicle concepts rely on "contactless" technologies, including sensors and electronic control systems with automotive-grade reliability, which nevertheless remain susceptible to failures (software bugs, blackouts, etc.). Consequently, most manufacturers restrict themselves to level 2 driver-assistance systems, which still require the driver to remain constantly vigilant and ready to take control, thereby relieving manufacturers from liability in the event of an accident caused by a malfunction of the contactless trajectory control system in autonomous mode.

However, it is undisputed that drowsiness at the wheel remains one of the leading causes of accidents on motorways, and level 2 assisted driving, which relieves the driver from the need to keep the vehicle constantly centered in the lane, does not help reduce the monotony inherent to high-speed driving on separated roadways such as highways or expressways.

Given current traffic volumes and travel speeds, the loss of visual cues, such as missing lane markings or a brief interruption of the contactless guidance system-even for a fraction of a second—can result in loss of control or collision.

Although the aeronautical industry has developed electrical systems with very high reliability, such systems are too costly for automotive applications and, above all, require periodic maintenance programs of a quality level that is difficult to reconcile with routine automotive servicing as perceived by today's drivers. Indeed, while there are only a few hundred thousand aircraft worldwide, there are over a billion vehicles on the roads today-over 5,000 times more.

It is therefore unsurprising that all serious projects for fully autonomous vehicles "without immediate driver vigilance" are currently limited to very low speeds (e.g. in traffic jams) to minimize accident consequences, or focus on shared vehicles owned by fleet operators, who alone can absorb the high acquisition costs and ensure rigorous maintenance. Additionally, while electric propulsion offers significant improvements in reducing pollution and noise, it still faces the challenge of heavy on-board energy storage.

For example, 100 kg of lead-acid batteries are needed to store the energy equivalent to just one liter of gasoline weighing about 700 grams. Although lithium-ion technology has quadrupled battery energy density over the past twenty years—from 40 Wh/kg to over 150 Wh/kg-driving range remains insufficient and is a significant barrier to widespread electrification of automotive fleets in developed countries.

Moreover, the manufacture and recycling of these batteries have a substantial environmental impact, which contradicts ecological goals set for the coming decades of the 21st century.

Many research works have explored the possibility of contactless charging of vehicles in motion via magnetic induction. However, due to the gap between the transmitter and receiver, efficiency drops significantly, and infrastructure costs remain prohibitive for widespread deployment.

Furthermore, long-distance travel increasingly takes place on dual carriageways, expressways, or motorways featuring separated roadways.

An object of the present invention is to provide a dedicated U-shaped gutter disposed alongside a traffic lane, designed to accommodate a pair of lateral wheels of vehicles. This U-shaped gutter functions as a mechanical lane-keeping system formed by the cooperation of two side surfaces-one being part of the base of the cast-in-place crash barrier of the "Jersey" wall type and the other forming part of a continuous rail anchored into the roadway alongside the dedicated U-shaped gutter.

This dedicated U-shaped gutter advantageously utilizes the otherwise unused space between the "Jersey" wall and the continuous lane marking that borders the high-speed lane. This roughened zone does not encroach on existing traffic lanes and enables safe highly automated driving for suitably equipped vehicles. The U-shaped gutter shares the roadway laterally with conventional traffic, thereby allowing an economically viable transition toward a gradual deployment of highly automated driving modes.

In the Applicant's earlier PCT application PCT-FR93-00486 (published as WO 94-26573), the safety benefits of such guided traffic—with all pair of lateral wheels running inside a U-shaped gutter-were already demonstrated. However, the described system required either an interruption of one side surface of the U-shaped gutter to allow the wheels to enter or exit laterally, or a frontal entry and exit as seen in the "O-Bahn" system used by buses in Adelaide, Australia, since the 1990s, based on principles tested in the "Tracline 65" project in Birmingham, England, in the 1980s. However, interruptions of a side surface pose safety risks in case of steering system failures or during emergency braking within zones where the side wall is interrupted. Both U.S. Pat. No. 712,541-A and U.S. Pat. No. 1,118,853-A disclose that the sides of a protruding wheel guide can be sloped downwards to road level. U.S. Pat. No. 1,288,664-A disclose two side trough shape tracks with longitudinal groove, identical in construction, to receive vehicle wheels and maintain them in the safely spaced relation when passing one another in either the same or opposite directions. While all the above listed disclosures show guide gutter which can be engaged with one wheel of a vehicle through lateral movement and gravity, causing the vehicle wheel to "fall" into the gutter, none of the disclosures provides a solution to extract the vehicle while the vehicle is moving.

The present invention offers a new solution for entering and exiting the dedicated U-shaped gutter by providing an auxiliary support enabling the pair of lateral wheels to laterally cross the inner side surface at cruising speed, potentially matching the current maximum legal highway speeds in most countries.

Advantageously, retractable rollers mounted on the stub axles of the pair of lateral wheels allow the vehicle to momentarily relieve the load on the pair of lateral wheels by rolling onto an auxiliary running surface located at the upper edge of the inner side surface of the dedicated U-shaped gutter, ensuring vertical placement onto the running surface without impact when entering, and enabling extraction of the pair of lateral wheels from the U-shaped gutter, also at cruising speed.

The main function of this system lies in providing, for a vehicle operating in highly automated driving mode with a pair of lateral wheels running inside the dedicated U-shaped gutter, a mechanical emergency lateral guidance to control the vehicle's trajectory in the event of emergency mode activation due to a failure of the primary steering system. As a result, the highly automated driving mode according to the invention enables the vehicle to enter or exit laterally at any point along the shared infrastructure, and at higher speeds than systems requiring entry through specific dedicated gates, as in the O-Bahn system.

Thanks to these essential features of the invention, there is no longer any need for privileged entry or exit zones along the dedicated U-shaped gutter; vehicles may enter or leave it at any location. Advantageously, this exclusive dedicated U-shaped gutter may be bordered directly by a crash barrier of the "Jersey" type or other lane-separating wall on a divided roadway, with the side surface bordering the U-shaped gutter carried by the lower portion of the Jersey barrier. This design advantageously utilizes the unobstructed strip of pavement located between the Jersey wall and the continuous white lane marking that defines the fast lane.

Thus, even if installed along the left-hand side of a separated roadway (in the case of right-hand driving), the dedicated U-shaped gutter for vehicle guidance retains all its functional characteristics, allowing the modified infrastructure to remain usable by vehicles under conventional driver control. This greatly facilitates adoption of the system and leaves open the possibility for a progressive increase in the number of vehicles equipped for highly automated driving, without requiring substantial upfront investment.

Advantageously, the pair of lateral wheels may be equipped with variable-height suspensions, whose height is adjusted in synchronization with the lateral movement of the wheels to minimize body roll. The suspension height of the other pair of lateral wheels can also be adjusted to eliminate body roll during entry into and exit from the dedicated U-shaped gutter, making the transition imperceptible for both driver and passengers.

By continuously measuring the lateral distance between the vehicle and the side surfaces bordering the dedicated U-shaped gutter, via one or more lateral distance sensors placed ahead of the front wheel, a servo-control system for the steering can keep the front wheels centered in the U-shaped gutter. This provides a simplified highly automated driving mode that does not rely on visual detection of lane markings. Although this lateral distance can be measured continuously by multiple sensors positioned ahead of the front wheel, failures in the distance-measuring system are still possible. In such cases, physical contact between the sidewalls of the tires—or the rim edges in case of a flat tire—and the side surfaces of the U-shaped gutter can maintain the vehicle's trajectory until an emergency stop. The vehicle can then exit the U-shaped gutter by turning its front wheels at a standstill, thus clearing the dedicated track. This manual exit procedure is also applicable to any vehicle not equipped with the system that accidentally finds itself with its pair of lateral wheels inside the U-shaped gutter. It is obvious to a person skilled in the art that, to minimize failures, authorities will likely impose rigorous periodic inspections of the guidance and emergency braking devices.

Another objective of the present invention is to facilitate electric mobility via dynamic charging at very low voltage, arranged along the traffic lanes, from which each vehicle can be supplied with voltages below 50 V AC or 120 V DC to comply with safety standards. It is noted that although this voltage is lower than the typical 400 V battery pack standard, a very low safety voltage of 120 V DC still allows sequential charging of each 100 V section of the battery pack by switching, as modern batteries are composed of cell elements each carrying only a few volts.

In a preferred embodiment, the Jersey barrier features a "third rail" positioned above the first side surface on each side of the U-shaped gutter, which is connected to one pole of a very low voltage power source. The vehicle is equipped with a lateral sliding shoe that ensures electrical charging during driving, while the other pole, connected to the continuous rail made of conductive material, is contacted by a brush or any other known device.

Indeed, from the perspective of global energy efficiency—which considers not only the energy required to propel the vehicle but also the energy needed for extracting raw materials and manufacturing the vehicle and its battery packs—the present invention makes it possible to significantly reduce the capacity, and therefore the weight, of on-board battery packs. This leads to lower $CO_2$ emissions associated with manufacturing. Moreover, the very low voltage of 120 V DC collected via sliding contact allows direct power supply to the motor in autotransformer mode, without needing to route power through the batteries. The batteries are then used only to supply temporary additional energy or to recover excess energy from slopes or speed changes encountered during highly automated driving.

Finally, the present invention aims to reduce current roadway congestion by enabling platooning of multiple vehicles. This mitigates the inherent risks of platooning—where inter-vehicle distances are reduced—through the presence of an onboard emergency braking caliper.

Tests performed in the 1990s as part of the PATH (Partners for Advanced Transit and Highways) program demonstrated that aerodynamic drag could be reduced by 20% when vehicles were driven at a distance of only one meter apart. However, this configuration created challenges for the control systems, particularly the risk of collisions between vehicles in the platoon during emergency braking situations.

To address this problem, the invention provides an emergency braking caliper capable of achieving decelerations of several g, mounted on the rear of the vehicle, preferably behind the rear wheel. This caliper can engage and disengage from the continuous rail during entry into and exit from the highly automated driving mode. This device advantageously maximizes the reaction time available for detecting and responding to transient or permanent obstacles on the dedicated U-shaped gutter by significantly reducing the braking distance, potentially to less than the two-second separation rule currently required for high-speed driving on highways. Consequently, the emergency braking caliper according to the invention provides extra time for obstacle analysis and prevents degradation of braking performance in wet or icy conditions.

Advantageously, this braking system can be combined with a telescopic bumper integrated into the vehicle's front bumper. This operates by inertia, similar to systems used on heavy trailer couplings, to mechanically activate the emergency braking caliper in emergency mode if the onboard electronic control system fails or in the event of a total power blackout.

The invention thus makes it possible to increase roadway traffic throughput without requiring the construction of additional lanes, as is the case today, representing a significant economic and environmental benefit.

For example, instead of widening a motorway to two times three lanes when peak traffic exceeds 4,000 vehicles per hour, the invention could raise the flow capacity to over 6,000 vehicles per hour at cruising speeds, achieving this for only a fraction of the cost of constructing a third lane.

The continuous rail offers:

on one hand, a straight and stable support surface, free from abrupt variations like those found on asphalt roads, enabling the rollers of the auxiliary support to facilitate the high-speed lateral entry and exit of wheels into and out of the dedicated U-shaped gutter; and on the other hand, lateral guidance to keep the vehicle on its intended trajectory in emergency mode.

The continuous rail is advantageously composed of rail sections joined together, allowing clamping and frictional force transmission sufficient to absorb several tens of tons of braking forces that may be exerted by a group of vehicles traveling in a platoon.

The invention is a secure highly automated traffic system for a vehicle, comprising:

a dedicated U-shaped gutter disposed alongside a traffic lane and configured to receive a pair of lateral wheels of the vehicle;

the U-shaped gutter including a running surface substantially parallel to the pavement surface of the traffic lane;

and two side surfaces positioned on opposite sides and extending above the running surface, including:

a first side surface located outward relative to the vehicle's footprint; and a second side surface located inward relative to the vehicle's footprint;

both side surfaces being substantially perpendicular to the running surface;

the second side surface having a height corresponding to the minimum ground clearance of the vehicle, permitting passage of the vehicle without interference;

an auxiliary running surface provided at the upper edge of the second side surface and substantially parallel to the running surface; and the second side surface and auxiliary running surface being supported by a continuous rail;

the system further comprises:

an auxiliary support enabling the vehicle to cross laterally over the second side surface and the auxiliary running surface;

the auxiliary running surface connects to said pavement surface of the traffic lane via a gently sloping ramp oriented perpendicular to the direction of traffic;

the auxiliary support comprises at least one roller mounted on a support arm articulated to the stub axle of the front wheel of the pair of lateral wheels;

the auxiliary support device is vertically retractable between the following positions:

in the lowered position, the auxiliary support device positions the roller substantially at the same height as the lowest contact point of the front wheel tire on the pavement, and even though the front wheel is aligned vertically with the dedicated U-shaped groove, the front wheel tire does not contact the running surface of the U-shaped groove, and the roller rolls on the auxiliary running surface to temporarily support the load of the front wheel and maintaining so the cruising speed; and in the raised position, interference with the minimum ground clearance of the vehicle is avoided.

The auxiliary support enables the vehicle to laterally cross the inner side surface via a gently sloping ramp oriented perpendicular to the direction of travel, which connects the pavement surface to the upper edge of the inner side surface of the dedicated U-shaped gutter.

The lateral crossing of the inner side surface may also be facilitated by positioning the running surface of the dedicated U-shaped gutter at a lower height than the pavement surface.

The means for lateral crossing of the inner side surface can advantageously combine:

a gently sloping ramp perpendicular to the direction of travel, connecting the pavement surface to the upper edge of the inner side surface; and the running surface of the dedicated U-shaped gutter positioned at a lower elevation relative to the pavement surface.

The upper edge of the inner side surface comprises an auxiliary running surface, substantially parallel to the pavement surface. The front wheel of the pair of lateral wheels is equipped with an auxiliary support capable, during cruising speed, of temporarily relieving the load of the front wheel by supporting it on the auxiliary running surface. The auxiliary support is vertically retractable between:

a raised position avoiding interference with the minimum ground clearance of the vehicle; and a lowered position in which the lowest contact point of the auxiliary support is substantially level with the contact point of the front wheel tire on the pavement surface.

The auxiliary support comprises at least one roller mounted on a support arm hinged to the stub axle of the front wheel of the pair of lateral wheels. The inner side surface and the auxiliary running surface are carried by a continuous rail.

The continuous rail further comprises a third surface, ledge-like, which is substantially parallel to and located below the auxiliary running surface. The third surface and the auxiliary running surface are configured to be clamped by an emergency braking caliper connected to the vehicle's structure, generating a braking force by friction on the rail. This braking force can, in an emergency, reach values exceeding 1 g (9.81 m/s$^2$), independently of the friction coefficient between the wheels and the pavement.

The pair of lateral wheels may be equipped with variable-height suspensions. The height of these suspensions:

decreases during the lateral ascent of the gently sloping ramp, while the auxiliary support is lowered as the pair of lateral wheels moves over the auxiliary running surface and vertically aligns with the dedicated U-shaped gutter; and increases to lower the wheels onto the running surface, while the auxiliary support simultaneously retracts upward.

This sequence minimizes or even eliminates vehicle body roll during high-speed lateral entry into the dedicated U-shaped gutter. The reverse sequence is used when extracting the wheels to leave the dedicated U-shaped gutter and return to the pavement surface.

Ahead of the pair of lateral wheels, a lateral distance sensor measures the distance between the vehicle and the outer side surface of the dedicated U-shaped gutter. This sensor controls the vehicle's steering system to keep the pair of lateral wheels generally centered in the dedicated gutter during highly automated driving.

A "third rail," powered by one pole of an electrical power source, is positioned along the outer side surface of the dedicated U-shaped gutter. The return conductor to the source is provided by the conductive continuous rail. The vehicle is equipped with known means, such as a sliding shoe, to establish electrical contact with both the third rail and the continuous rail while driving.

The yaw torque generated during emergency braking between:

the inertial force acting along the vehicle's longitudinal axis, substantially at the vehicle's center of gravity; and the braking force acting on the continuous rail is counteracted by torque resulting from lateral forces generated by:

the contact force exerted by the sliding shoe, which is locked in the retracted position, on the third rail located outside the gutter and positioned ahead of the emergency braking caliper; and the lateral contact force exerted by the emergency braking caliper jaws on the continuous rail.

The invention further provides a method for transitioning between conventional high-speed road travel and secure highly automated driving mode at cruising speed. The method involves a dedicated U-shaped gutter positioned along the edge of the roadway, capable of receiving one pair of lateral wheels of the vehicle by vertical placement for entry and vertical extraction for exit. The pair of lateral wheels is equipped with rollers fixed in a vertically retractable manner to the inner faces of the wheel stub axles. In the lowered position, the lowest part of the rollers is substantially level with the tire-road contact point. The method comprises the following steps for entry:

1. extending downward said retractable roller, such that its lowest contact point, in the lowered position, is at the same level as the lowest contact point of the tire of said front wheel;

2. laterally steering the vehicle toward said dedicated U-shaped gutter, allowing said pair of lateral wheels to gently ascend said sloping ramp;

3. continuing lateral movement until the centerline of said pair of lateral wheels is vertically aligned with the centerline of said dedicated U-shaped gutter, with said retractable roller temporarily bearing the load of said front wheel by rolling onto said auxiliary running surface;

4. retracting upward said retractable roller to vertically place said pair of lateral wheels onto said running surface, then to exit:

extending downward said retractable rollers to contact and roll onto said auxiliary running surface, thereby unloading said pair of lateral wheels from said running surface;

further extending downward said retractable rollers to lift said front wheel such that its lowest contact point reaches the level of said auxiliary running surface;

steering the vehicle away from said dedicated U-shaped gutter;

continuing lateral movement until said pair of lateral wheels fully engages with said sloping ramp and gently descends onto the pavement surface of the traffic lane;

retracting upward said retractable roller to restore clearance relative to the vehicle's minimum ground clearance.

This method is further refined when the pair of lateral wheels is equipped with variable-height suspensions, wherein:

during entry, in step 2, decreases simultaneously with the climbing of the sloping ramp, and in step 4, the suspension height of the pair of lateral wheels increases simultaneously with the retraction of said retractable roller;

during exit, in step 2, the suspension height of said pair of lateral wheels decreases simultaneously with the downward extension of said retractable roller, and in step 4, increases simultaneously with the descent of said sloping ramp.

Other features and advantages of the invention will become apparent from the following description of an example of its implementation, with reference to the accompanying drawings, in which.

Figures 2, 3, 4:
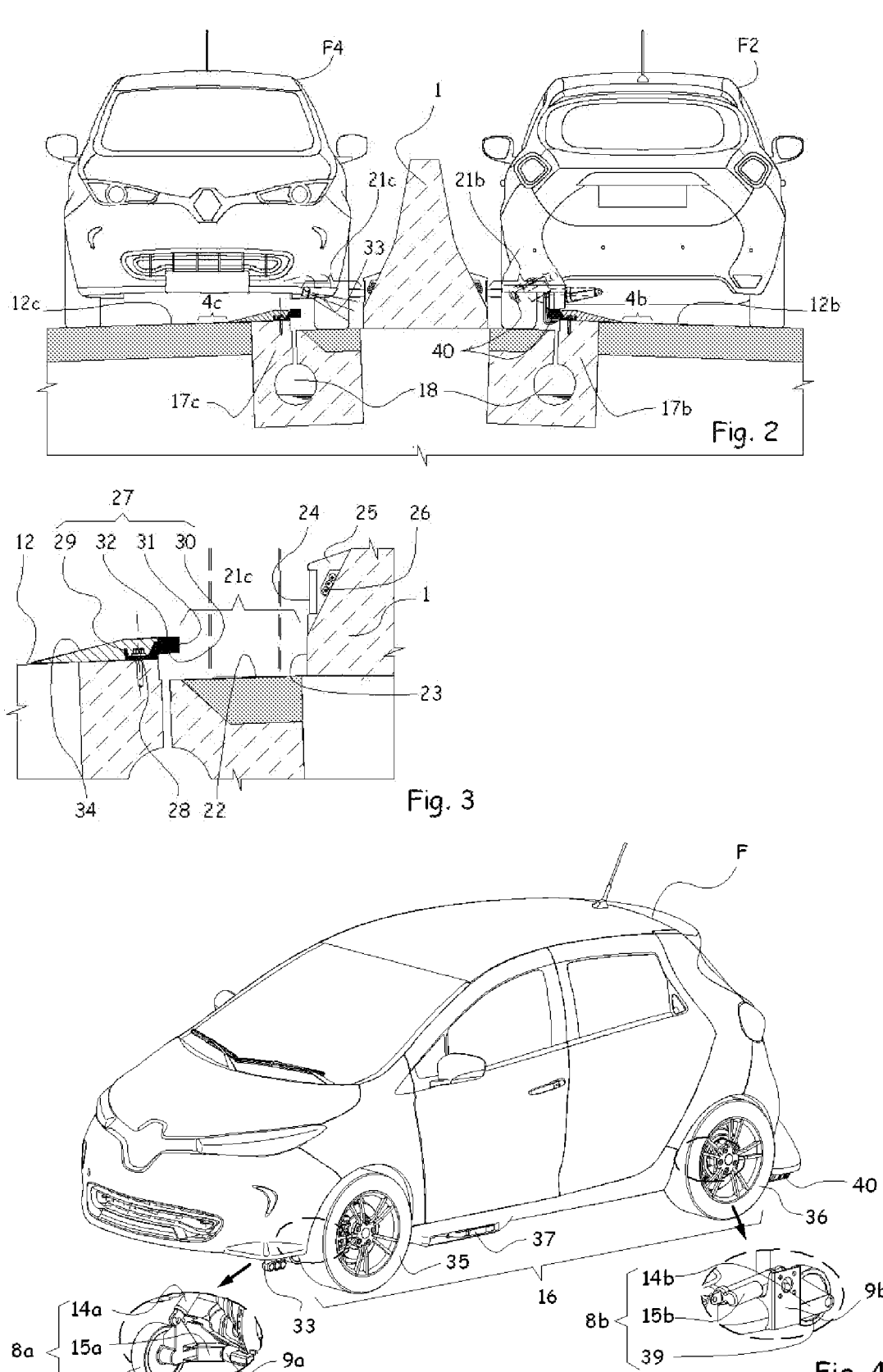
FIG. 2 is a front view showing two vehicles traveling in opposite directions in highly automated driving mode, each with its left pair of lateral wheels engaged in a dedicated U-shaped gutter.

FIG. 3 details the dedicated U-shaped gutter enabling the highly automated driving mode shown in FIG. 2, with the left wheel of the vehicle schematically represented.

FIG. 4 is a perspective view of an electric car equipped with devices necessary for highly automated driving mode according to the invention, with enlarged views showing the auxiliary rollers.

Figures 5, 6:
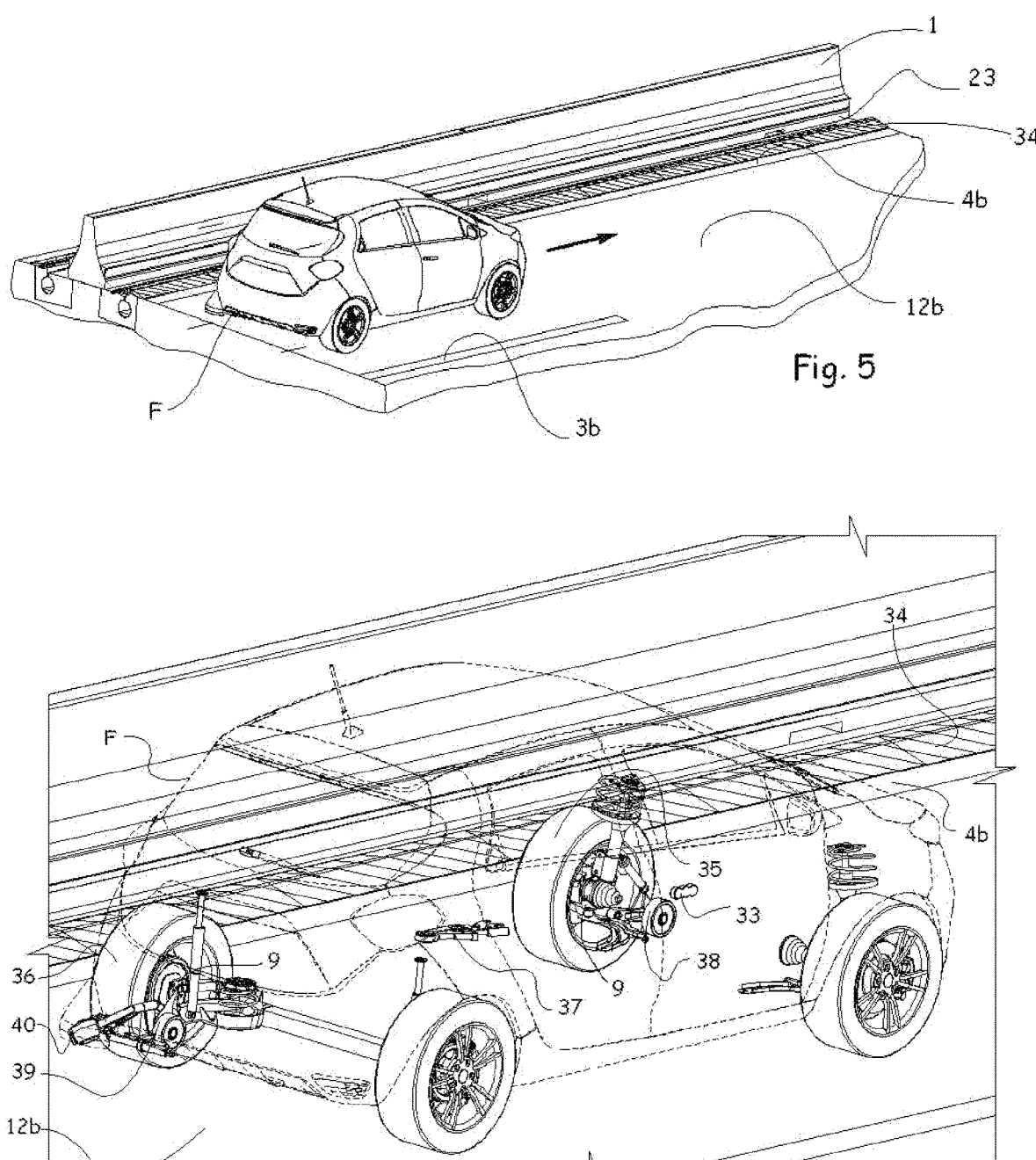
Figure 7:
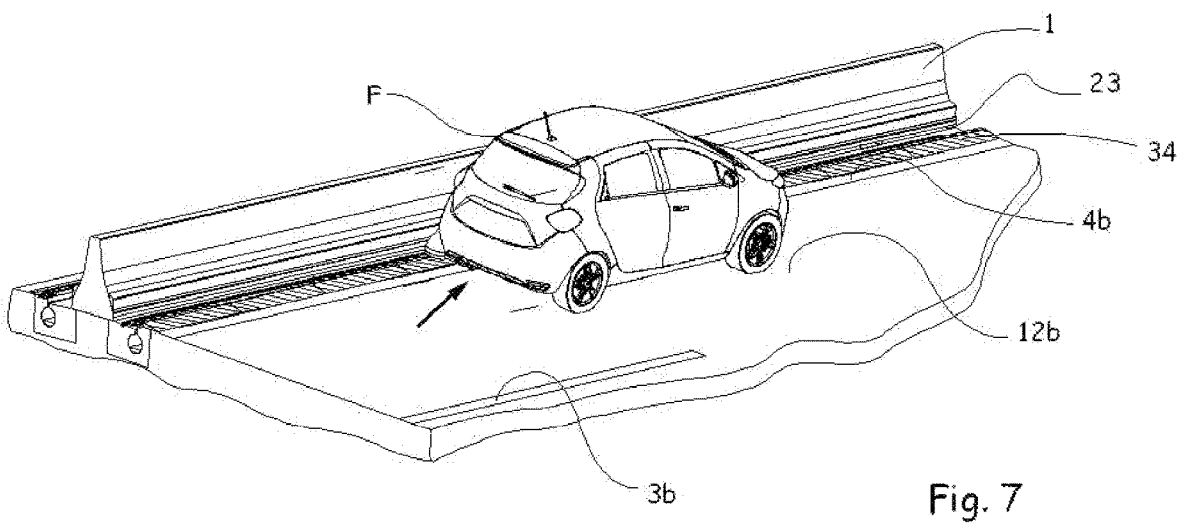
Figures 9, 10:
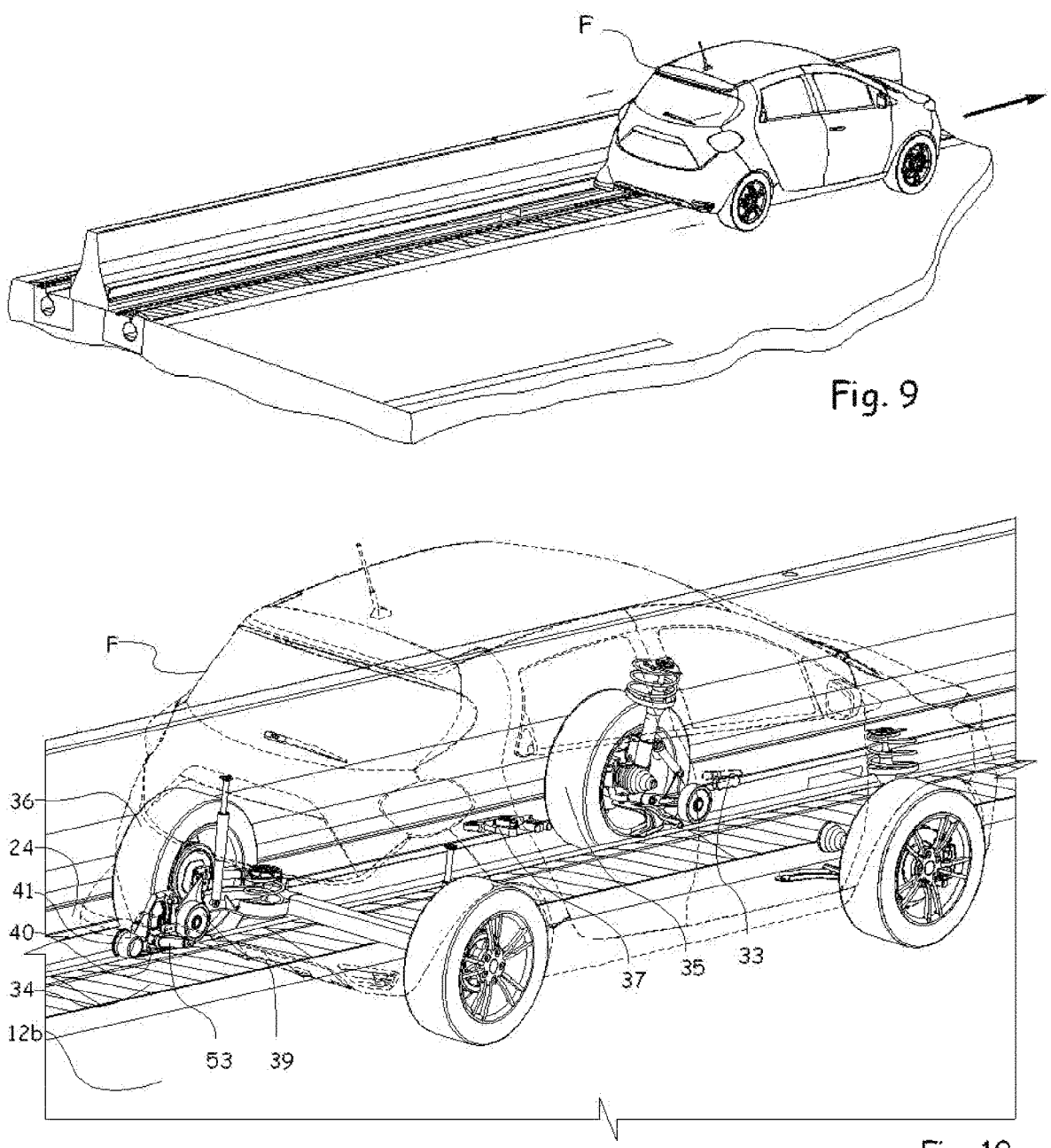

FIGS. 5, 7, and 9 are perspective views depicting the sequence of transitioning from conventional driving to highly automated driving mode, showing the lateral movement of the pair of lateral wheels over the ramp and into the U-shaped gutter.

Figure 8:
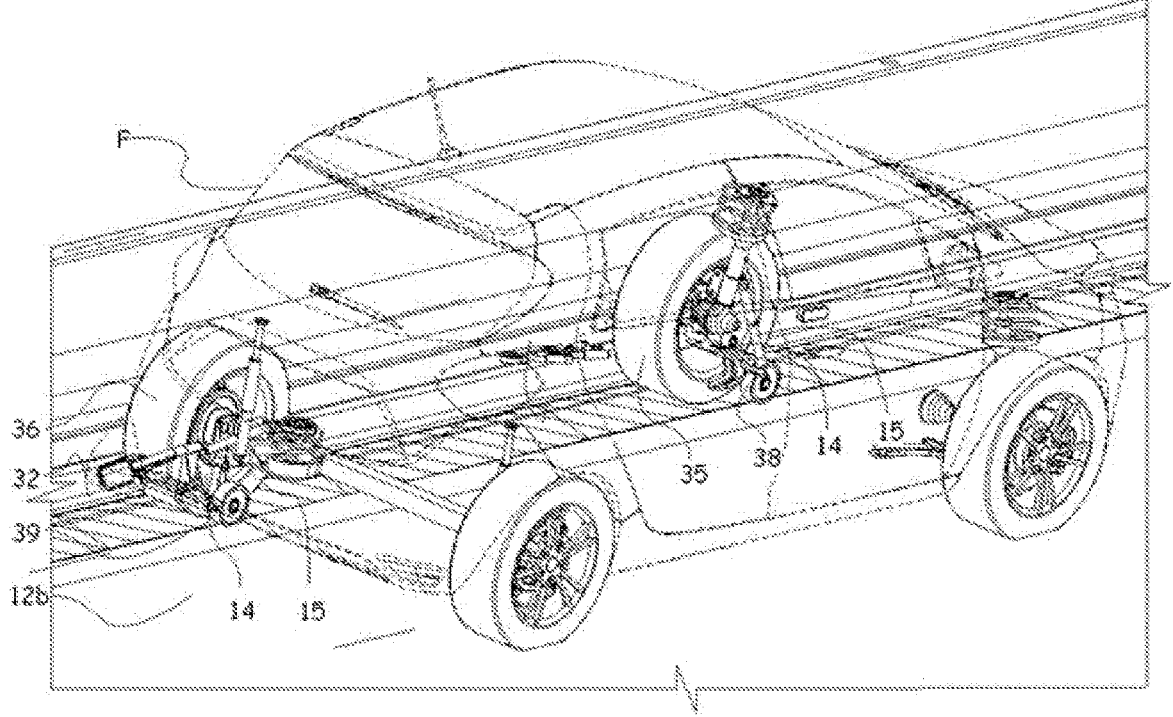

FIGS. 6, 8, and 10 are enlarged views of FIGS. 5, 7, and 9, respectively, with the vehicle shown transparently to illustrate the rollers temporarily supporting the vehicle's weight during the transition.

Figures 11, 12, 13:
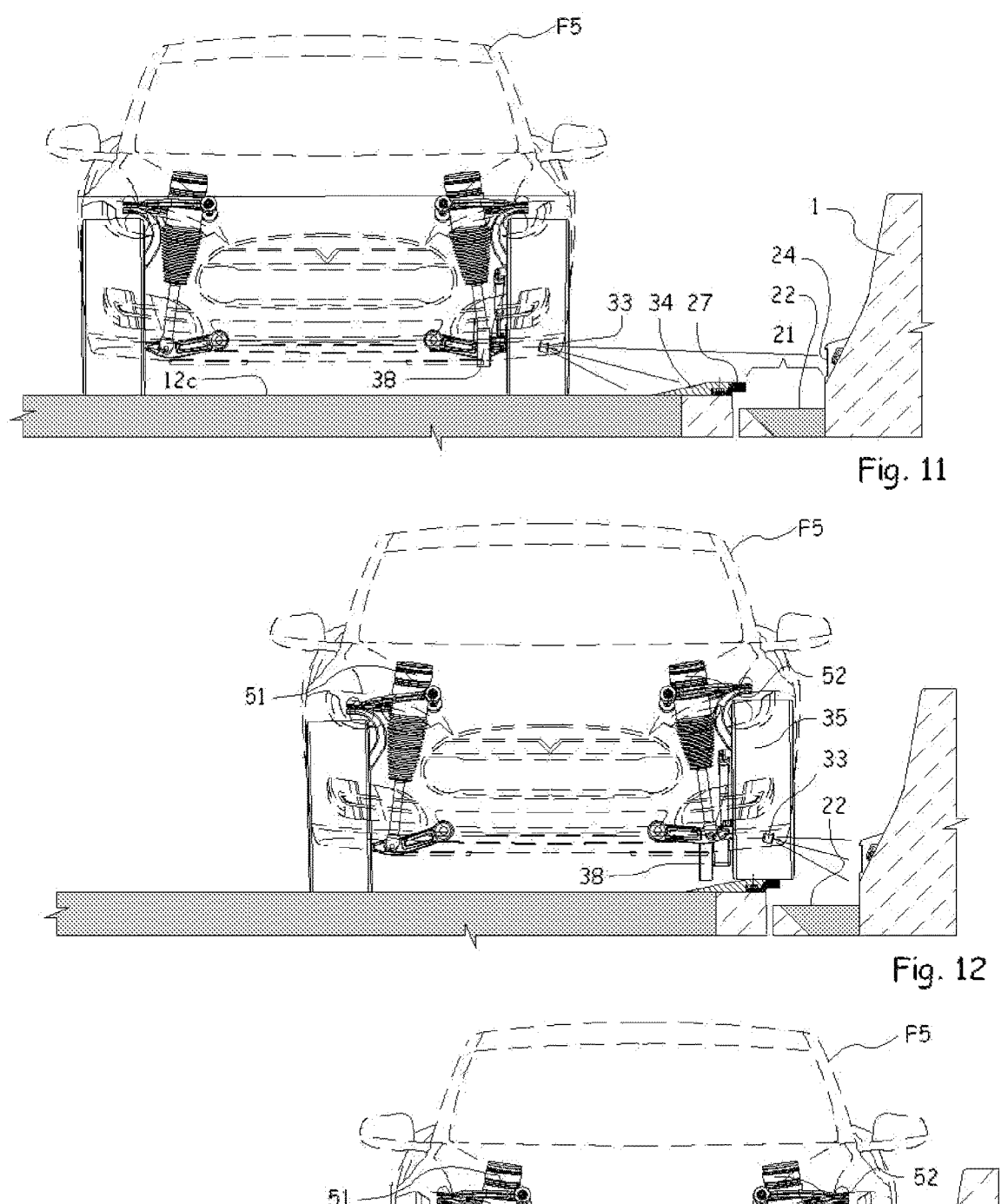

FIGS. 11, 12, and 13 show front views depicting the coordination between variable-height suspension adjustments and lateral vehicle movement to minimize or eliminate body roll during entry into and exit from the highly automated driving mode.

Figures 14, 15:
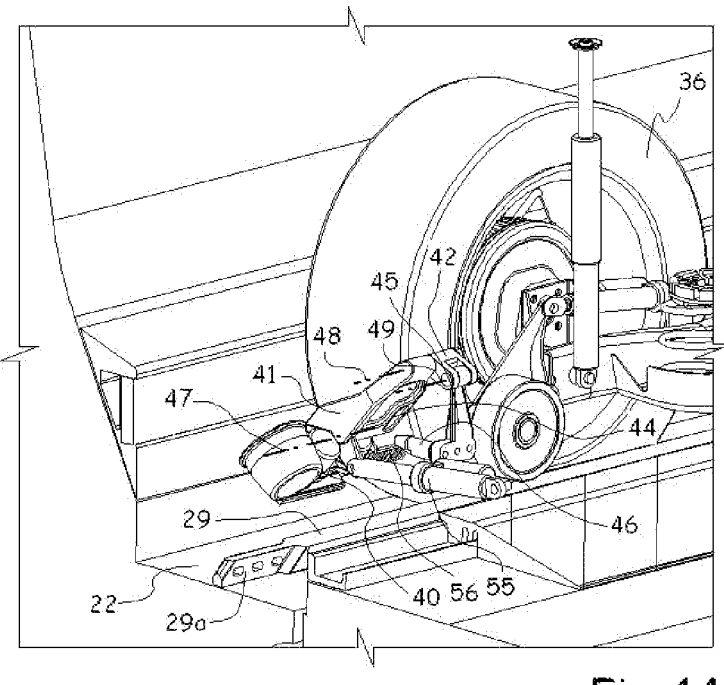

FIGS. 14 and 15 are perspective views illustrating the engagement and disengagement of the emergency braking caliper on the continuous rail and the assembly of the rail sections.

Figures 16, 17:
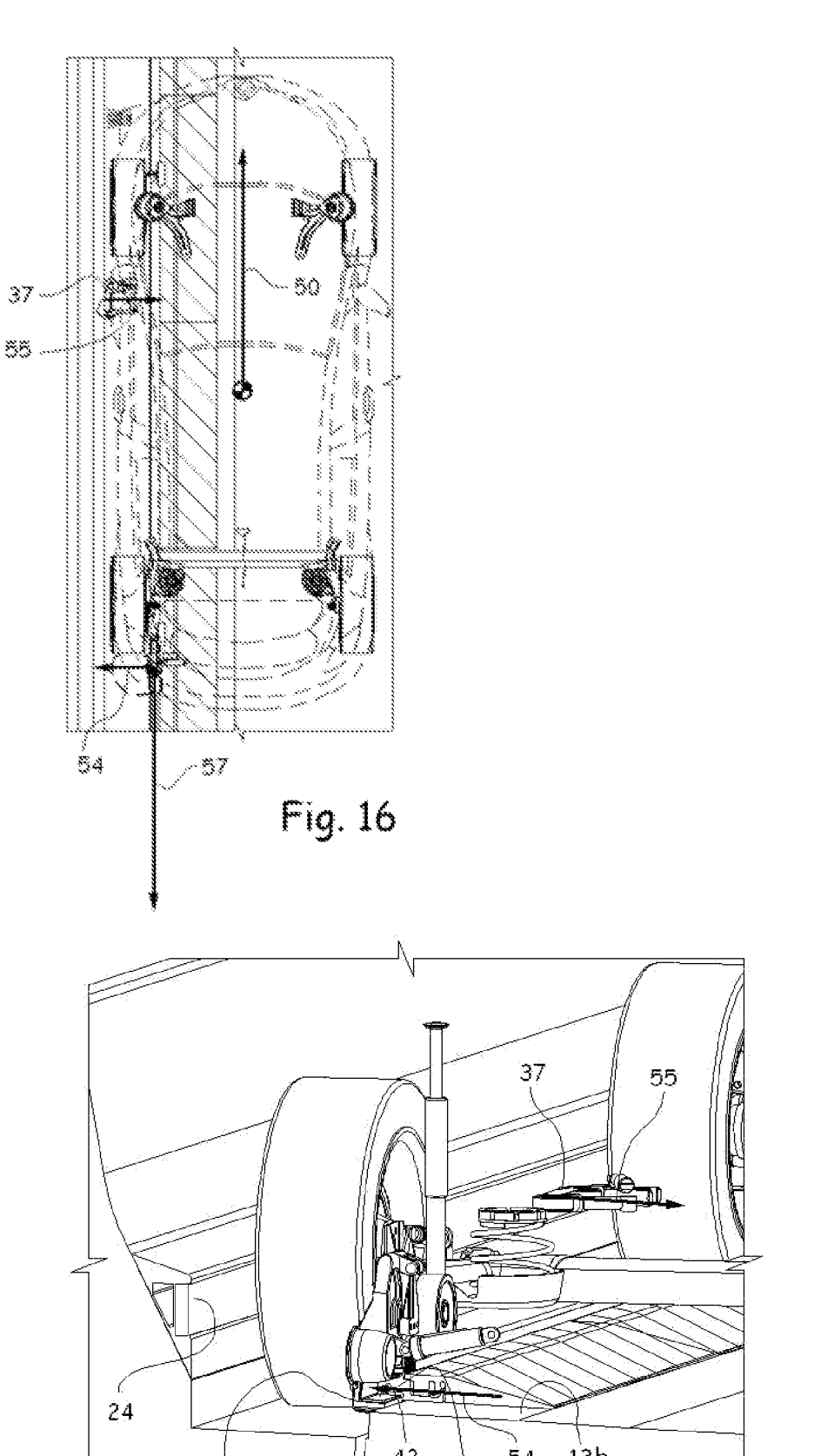

FIGS. 16 and 17 show, respectively, a top view and a perspective view of the yaw torque counteracting mechanism during emergency braking.

Figure 18:
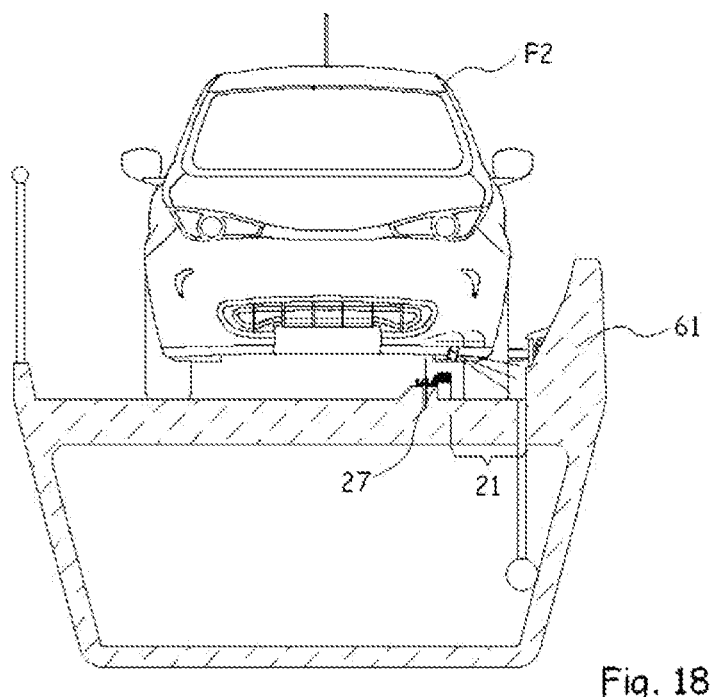
Figure 19:
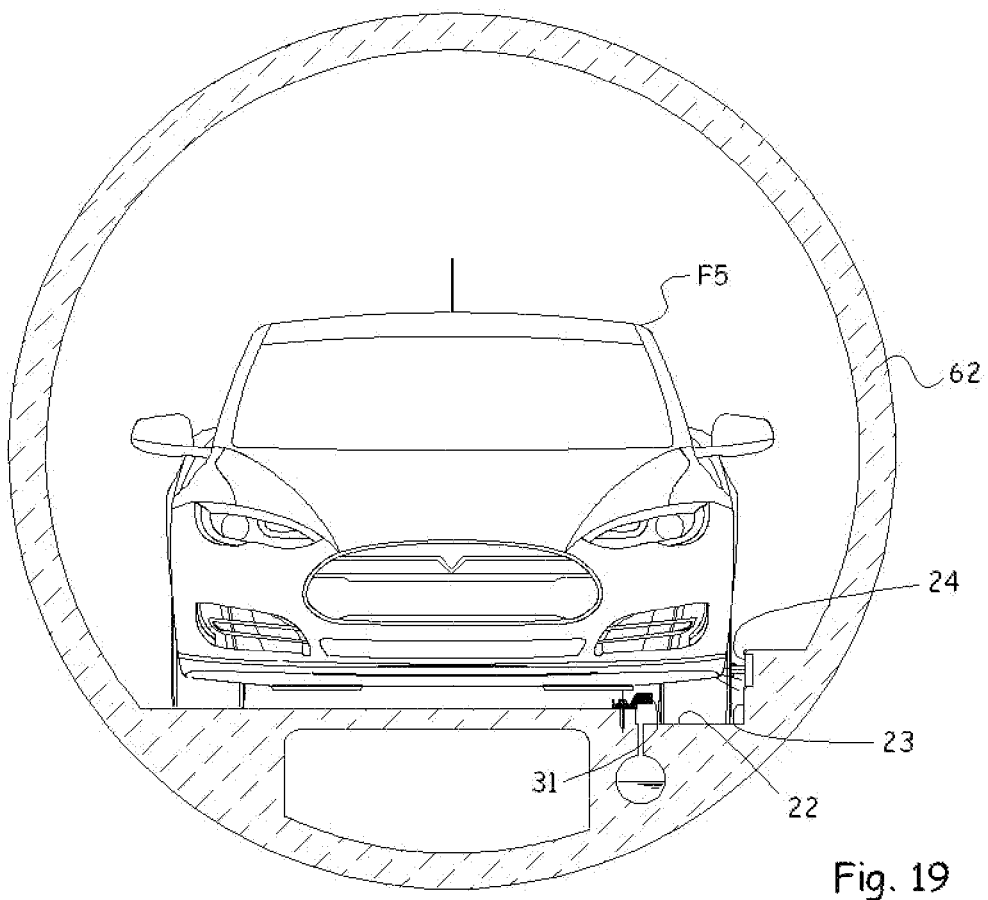

FIGS. 18 and 19 are front views of dedicated infrastructure of elevated or underground types, demonstrating the reduction in lane width enabled by the highly automated driving system according to the invention.

Figure 1:
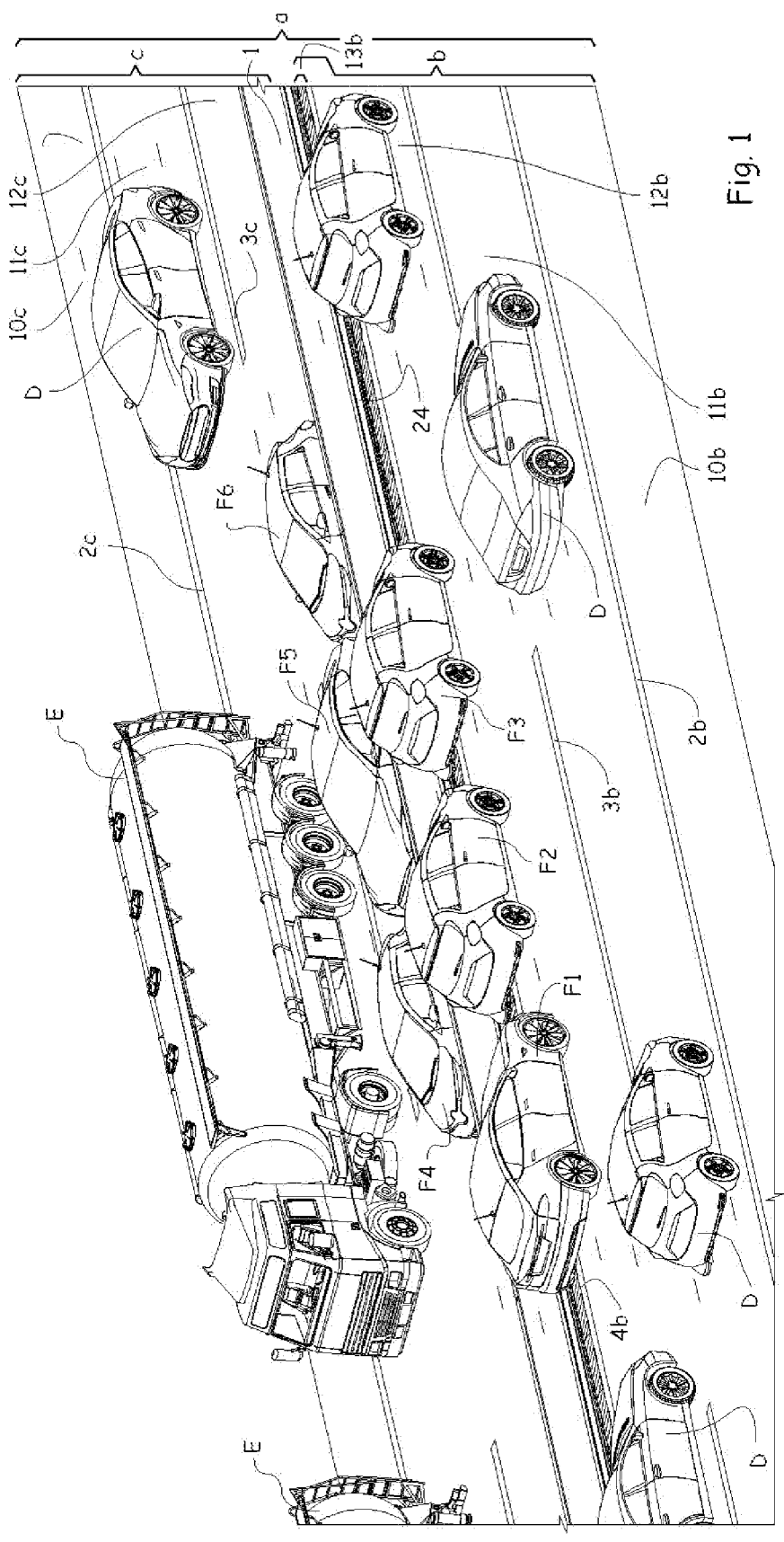
FIG. 1 shows a perspective view of right-hand traffic on a two-lane divided highway illustrating two platoons of three vehicles each traveling in highly automated driving mode according to the invention, sharing part of the roadway with conventional traffic.

FIG. 1 illustrates a divided highway "a" with right-hand traffic, comprising traffic lanes "b" and "c," separated by a concrete guardrail 1 of the well-known "New Jersey" type. Conventionally, the highway comprises, from the outside inward: shoulders 10b and 10c of variable width;

"slow" lanes, including carriageways 11b and 11c, typically 3.5 meters wide, delineated by two white lines-continuous on the right (2b, 2c) and dashed on the left (3b, 3c);

"fast" or overtaking lanes, comprising carriageways 12b and 12c, also usually 3.5 meters wide, delineated by dashed lines on the right (3b, 3c) and continuous lines on the left (4b, 4c);

a central roughened strip approximately 1 meter wide (13*b*, 13*c*), which may be reduced to 0.5 meters in urban or peri-urban contexts, separating the continuous lane marking (4*b*, 4*c*) from the concrete Jersey wall 1.

Light vehicles D and heavy vehicles E travel conventionally in lanes 11 and 12, under driver control, remaining generally centered in their lanes.

Light vehicles F1 to F6 operate straddling lane markings 4*b* or 4*c* in a platoon, in highly automated driving mode (pseudo-level 4 or 5 according to SAE standards), without requiring constant driver vigilance. Vehicles F travel astride the lane markings 4*b* or 4*c*.

FIGS. 2 and 3 illustrate a cross-sectional view of the central portion of roadway "a." At the center is the concrete guardrail 1 and two drainage gutters 17*b* and 17*c* of the known "slot pipe" type, made of precast concrete and comprising a drainage pipe 18 fed by drainage slots 13*b* and 13*c* located in the running surfaces 22. The gutters 17*b* and 17*c* are buried on either side at the base of the concrete guardrail 1. Vehicles F2 and F4 have their left pair of lateral wheels assemblies engaged in U-shaped gutters 21*b* and 21*c*, comprising:

a running surface 22 substantially parallel to and preferably lower than roadway 12, resting atop the drainage gutter 17*b* or 17*c*;

an outer side surface 23 forming the upper outer branch of the U, which can advantageously serve as the base of the concrete guardrail 1. Surface 23 is topped by a substantially vertical and recessed conductive "third rail" surface 24 mounted on an insulating support 25, which may advantageously house medium-voltage cables 26 supplying substations that deliver very low voltage power to the vertical conductive surface 24;

a continuous rail 27 forming the inner side surface relative to the vehicle F, fixed to the flange of its laminated profile 29 on the drainage gutter 17 via bolts 28. Rail 27 has three continuous surfaces:

a lower continuous surface 30, a continuous side surface 31, and an upper auxiliary running surface 32, all forming the cornice of the U-shaped gutter 21.

A gently sloping ramp 34, substantially matching the height of the continuous rail 27 and composed of ramp segments, is attached to the attachment flange of rail 29.

Thus, the substantially vertical side surfaces 23 and 31 serve as lateral guides, in emergency mode, to keep the pair of lateral wheels within the dedicated U-shaped gutter by physical contact between the sidewalls of the tires 35 and 36 (or the rim edges in the event of a flat tire) and the side surfaces 23 and 31. This emergency mode activates only in case of failure of the steering control system (not shown), which is already implemented in some vehicles offering level 3 automated driving. Advantageously, the steering control system can be simplified, not requiring optical recognition, and functioning instead using simple lateral distance telemetry, such as ultrasonic sensors 33, to keep the front wheel 35 of the vehicle centered on the running surface 22 during highly automated driving mode according to the invention.

FIG. 4 depicts a light electric vehicle F equipped with the systems necessary for highly automated driving mode according to the invention. It is a right-hand drive vehicle, with a left pair of lateral wheels 16 equipped with the following features specific to the invention:

a lateral distance sensor system 33, preferably multi-sensor, positioned ahead of the left front wheel 35;

a retractable sliding shoe 37 located at the bottom of the left side bodywork;

an auxiliary support system comprising two assemblies 8, each including a retractable roller 38, 39 mounted on a support arm 14 actuated by an actuator 15, preferably electric, attached to the stub axles 9 of the two left wheels 35 and 36;

an emergency braking caliper 40 located behind the left rear wheel 36.

FIGS. 5, 6, 7, 8, 9, and 10 illustrate the sequence of transitioning from conventional driving under driver control to highly automated driving mode according to the invention. The reverse sequence enables disengagement from highly automated driving back to conventional driving.

In FIGS. 5 and 6, vehicle F is traveling on the conventional lane 12*b*, bordered by dashed markings on the right (3*b*) and a continuous marking on the left (4*b*). The lateral distance sensor system 33 measures the distance between vehicle F and the concrete guardrail 1. The rollers 38 and 39, the sliding shoe 37, and the emergency braking caliper 40 are all retracted. If the system detects, for example via geolocalization, the existence of an infrastructure segment equipped according to the invention, and if the distance to the concrete barrier 1 and the vehicle speed meet certain criteria, the driver may initiate the transition to highly automated driving mode.

In FIGS. 7 and 8, vehicle F, having initiated the transition, steers left autonomously while maintaining cruising speed. The left wheels 35 and 36 cross lane marking 4*b* and climb ramp 34. Simultaneously, rollers 38 and 39 are deployed by rotating support arms 14 actuated by actuators 15. When wheels 35 and 36 are vertically aligned with the running surface 22, rollers 38 and 39 rest on the auxiliary running surface 32 of rail 27, temporarily supporting the load of wheels 35 and 36. As rollers 38 and 39 retract upward, wheels 35 and 36 are vertically placed onto the running surface 22.

In FIGS. 9 and 10, vehicle F has deployed the retractable sliding shoe 37, located at the bottom of the left side body, into sliding contact with the conductive surface 24, which may advantageously be made of aluminum to reduce Joule effect losses when contacting a steel surface. A brush or sliding shoe 56 (behind actuator 53) contacts the steel continuous rail 27 to establish the return current path. A dynamic electrical power transfer of approximately 25-30 KW per vehicle can thus be achieved. Simultaneously, emergency braking caliper 40 tilts forward and engages rail 27. Roller 41, resting on rail 27, holds the caliper linings 42 close to the three continuous surfaces 30, 31, and 32 without direct contact during normal operation.

Thanks to their high emergency braking capacity, greater than 1 g and independent of the grip between the tires and the road surface (because the emergency brake caliper 40 is attached directly to the rail 27), vehicles F1, F2, F3, and F4, F5, and F6 vehicles can advantageously travel in platoons with inter-vehicle distances of less than 1 meter, as illustrated in FIG. 1. This significantly increases the number of cars per hour on the road by grouping vehicles into platoons of two or more. With platoons of three to four vehicles, maximum throughput can increase by approximately 250%, from around 1,700 vehicles/hour to nearly 6,000 vehicles/hour in a dedicated lane. Known short-range measurement devices, such as ultrasonic sensors, allow for reduced distances between vehicles in the same platoon, significantly reducing aerodynamic drag.

Vehicles traveling in such platoons may leave the group at any time using communication systems between vehicles, such as Wi-Fi, Bluetooth, or similar technologies. Before a fork or split in the roadway—not merely a simple exit, which would require a return to conventional driving—the vehicle intending to take the right-hand branch must exit the highly automated driving mode and can only re-enter it upon joining the dedicated U-shaped gutter of the new branch. The vehicle intending to leave the platoon sends a signal to vehicles ahead and behind, which automatically adjust their speeds to re-establish the required 2-second separation distance. For instance, at a speed of approximately 120 km/h, about ten seconds are needed to restore this regulatory distance, allowing safe departure from the platoon and the highly automated driving mode according to the invention. When a large portion of traffic operates in highly automated driving mode and lane markings are easily detectable, a vehicle equipped with level 3 autonomous driving capability could execute, without direct driver intervention—but under driver supervision—the disengagement maneuver to exit the dedicated U-shaped gutter 21 before a junction, perform the lane change to take the right branch, and then re-enter the U-shaped gutter 21 of the new lane. Reference beacons installed in junction areas can assist the basic autonomous system (level 3) in precisely locating the vehicle relative to infrastructure under low-visibility conditions (night, rain, fog, etc.).

FIGS. 11, 12, and 13 illustrate the sequence of transitioning from conventional driving under driver control to highly automated driving mode according to the invention, in the case of a vehicle equipped with variable-height suspensions. This feature advantageously minimizes or eliminates any vertical movement and body roll during the transition.

FIG. 11 shows, in front view, vehicle F5 with variable-height suspension traveling on conventional lane 12c. The lateral distance sensor system 33 measures the distance between vehicle F5 and the concrete guardrail 1, with roller 38 in the raised position. If the measured distance meets a predetermined value and the vehicle speed is sufficient, the driver may initiate the switch to highly automated driving mode.

FIGS. 12 and 13 show vehicle F5, while maintaining cruising speed, steering left onto U-shaped gutter 21. The left front wheel 35 crosses lane marking 4b and climbs ramp 34. Simultaneously, the right-side suspensions 51 are raised, while the left-side suspensions 52 are lowered to neutralize vehicle roll. Rollers 38 and 39 are lowered, and when wheels 35 and 36 are vertically aligned with running surface 22, the left-side suspensions 52 are raised to gently place wheels 35 and 36 (the latter hidden behind wheel 35) onto running surface 22. Rollers 38 and 39, which temporarily supported the load of wheels 35 and 36, retract upward so that the wheels alone carry the lateral weight of vehicle F5.

FIG. 14 illustrates an advantageous joint system for connecting the rail sections 29 that form the continuous rail 27. The front end of rail section 27, in the direction of travel, is shaped as an open mortise 29b, while the rear end is formed as a tenon joint 29a. The connection can be secured using, for example, three locked BTR screws. Advantageously, the ends of tenon joint 29a and mortise 29b are inclined in both vertical and horizontal planes to avoid abrupt height discontinuities in a transverse plane. This system allows for manufacturing tolerances in rail section lengths, facilitating maintenance and replacement.

FIGS. 14 and 15 illustrate the emergency braking system of the invention, which enables platooning of light vehicles with minimal inter-vehicle spacing. This system is particularly suitable for mitigating collision risks in highly automated driving where trajectory and speed control are managed by the system rather than by the driver's direct input. Thanks to scanning systems-such as radar—that detect vehicles or obstacles on the path, the control system can adjust vehicle speed. However, in the event of sudden obstacles or stopped or damaged vehicles, the emergency braking caliper of the invention offers significantly greater deceleration capabilities than conventional vehicle braking systems, which are typically limited by the tire-road friction coefficient (often below 1).

In FIG. 14, wheel 36 of vehicle F has just been placed onto running surface 22. Emergency braking caliper 40 is in its disengaged position, tilted obliquely about axes 48 and 49 behind wheel 36. On the caliper support 45, integral with the left rear suspension arm 47, a pin 46 fits into a hole 44 on the tilting caliper 40.

In FIG. 15, caliper 40 is engaged on continuous rail 27 by rotation about axes 48 and 49, which allow for height tolerance. Roller 41 holds caliper linings 42 close to surfaces 30, 31, and 32 of rail 27 without direct contact under normal conditions. Vertical piston(s) 53 are preferably located on the upper portion of caliper 40. Pin 46 on bracket 45 engages hole 44 to prevent rotation of caliper 40 relative to the rear axle around a transverse axis, due to the caliper's eccentric mounting relative to its tilt axes.

FIGS. 16 and 17 illustrate forces involved during high-capacity emergency braking, which generates a yaw torque due to lateral displacement between:

the braking force 57 exerted by the vehicle onto continuous rail 27; and the inertial force 50 acting substantially along the vehicle's longitudinal center plane.

This yaw torque is advantageously counteracted by the torque generated between:

the force 54 exerted by the caliper's jaws on continuous rail surface 31, preventing caliper disengagement from rail 27; and the force 55 exerted by the retractable sliding shoe 37, which, although normally applying minimal contact pressure during power collection from conductive surface 24, is locked in the retracted position when the emergency braking caliper is actuated.

FIG. 18 illustrates an example of a lightweight elevated "slide" footbridge 61, whose low cost is due to the reduced weight of vehicles operating in highly automated driving mode according to the invention. Such a footbridge allows crossings over urban areas, pedestrian zones, roads, highways, railways, rivers, etc.

FIG. 19 illustrates the small cross-sectional size of tunnel 62 required for dedicated U-shaped gutter traffic for light vehicles operating in highly automated driving mode according to the invention. This small size is possible due to the precise lateral positioning of vehicles enabled by the system. The invention allows greater flexibility regarding vehicle width compared to solutions based on external rollers, such as those proposed in the "Tracline 65," "O-Bahn," or more recently, by the "Boring Company" of Elon Musk.

The devices of the invention, which enable lateral entry into and exit from highly automated driving mode on shared road infrastructure with vehicles traveling in conventional free-driving mode, are particularly advantageous for solving the problem of access to and from dedicated lanes reserved exclusively for light vehicles, as illustrated in FIGS. 18 and 19.

The description and figures refer to right-hand traffic, but it will be obvious to those skilled in the art that the invention is equally applicable to left-hand traffic. Moreover, highly automated driving mode is not limited to electric or hybrid vehicles, as it is conceivable that vehicles powered by internal combustion engines could also benefit from the advantages of highly automated driving and platooning in regions where electrification of road infrastructure is not economically feasible.

A significant advantage of enhanced road mobility according to the invention is that transitions between conventional driving and highly automated driving can be implemented on existing infrastructure without substantial investment.

When a significant portion of the vehicle fleet is equipped for highly automated driving mode, and considering the narrow width footprint of a guided traffic lane according to the invention, it will become possible to create an additional lane on a divided highway or two-lane road without major construction, merely by shifting lane markings or slightly reducing lane widths.

Another significant advantage of enhanced road mobility according to the invention is the reduction in the required size of battery packs for fully electric vehicles. Such vehicles could operate with a battery capacity sufficient for less than 100 km between charges, representing a three—to fivefold reduction in battery weight. This leads to substantial savings in weight, cost, vehicle structural requirements, thermal management, and environmental impact compared to the larger batteries demanded by conventional free-driving electro-mobility.

It is understood that the devices according to the invention can be adapted to other separated-lane road configurations, including single-lane roads in each direction, alternative U-shaped gutter and rail geometries, or other vehicle designs. The examples described above are therefore only particular embodiments and do not limit the scope of the invention.

The invention claimed is:

1. A secure highly automated traffic system for a vehicle, comprising:
   a dedicated U-shaped gutter disposed alongside a traffic lane and configured to receive a pair of lateral wheels of said vehicle;
   said U-shaped gutter including a running surface substantially parallel to a pavement surface of the traffic lane; and two side surfaces positioned on opposite sides and extending above said running surface, including:
      a first side surface located outward relative to the vehicle's footprint; and
      a second side surface located inward relative to the vehicle's footprint;
   both side surfaces being substantially perpendicular to said running surface;
   said second side surface having a height corresponding to a minimum ground clearance of said vehicle, permitting passage of said vehicle without interference;
   an auxiliary running surface provided at the upper edge of the said second side surface and substantially parallel to said running surface;
   and said second side surface and said auxiliary running surface being supported by a continuous rail;
   wherein:
   the system further comprises an auxiliary support enabling the vehicle to cross laterally over said second side surface and said auxiliary running surface at cruising speed;
   said auxiliary running surface connects to said pavement surface of the traffic lane via a gently sloping ramp oriented perpendicular to the direction of traffic;

said auxiliary support comprises at least one roller mounted on a support arm articulated to a stub axle of the front wheel of the pair of lateral wheels;
   said auxiliary support device is vertically retractable between the following positions:
      in the lowered position, said auxiliary support positions the lowest contact point of said roller substantially at the same height as the lowest contact point of said front wheel tire on the pavement, and even though said front wheel does not contact said running surface of said U-shaped gutter, said front wheel is vertically aligned with said dedicated U-shaped gutter, said tire, and said roller rolls on said auxiliary running surface to temporarily support the load of said front wheel maintaining so the cruising speed; and
      in the raised position, interference with said minimum ground clearance of the said vehicle is avoided.

2. A system according to claim 1, wherein said continuous rail has a third surface substantially parallel to and below said auxiliary running surface, said third surface and said auxiliary running surface being pinched by an emergency braking caliper connected to the vehicle structure to generate an emergency frictional braking force on said rail, which, in emergency, can reach a value higher than 1 g (9.81 m/s$^2$), independently of the coefficient of adhesion between the vehicle tires and the pavement surface.

3. A system according to claim 2, wherein the yaw torque generated during emergency braking between:
   the inertial force of said vehicle acting along the longitudinal axis where the center of gravity of said vehicle is substantially located; and
   said emergency braking force acting on the continuous rail;
   is counteracted by torque generated by lateral forces, comprising:
      the contact force exerted by said electrical sliding shoe, locked in the retracted position, on said "third rail" located outside said U-shaped gutter and positioned ahead of said emergency braking calliper; and
      the lateral contact force exerted at the jaws of said caliper engaging said continuous rail.

4. A system according to claim 1, wherein at least said pair of lateral wheels is equipped with variable-height suspensions and the heights of said suspensions:
   decrease during the lateral ascent of said gently sloping ramp, said auxiliary support then being in a lowered position as the pair of lateral wheels moves over the auxiliary running surface to align vertically with said dedicated U-shaped gutter; and
   increase to place the wheels onto said running surface, while said auxiliary support simultaneously retracts upward;
   thereby minimizing or cancelling vehicle body roll during the lateral crossing of said second side surface and said auxiliary running surface at cruising speed, with the reverse sequence being used when extracting said wheels from said dedicated U-shaped gutter to return to said pavement surface.

5. A system according to claim 1, wherein a lateral distance sensor, positioned in front of said pair of lateral wheels, measures the lateral distance between said vehicle and said first side surface, said lateral distance controlling the steering device of said vehicle to maintain, at cruising speed, said pair of lateral wheels generally centered within said dedicated U-shaped gutter.

6. A method for entering and exiting a dedicated U-shaped gutter for securing highly automated driving at cruising speed, comprising:

a dedicated U-shaped gutter disposed alongside a traffic lane and comprising, at the top of its inner side surface adjacent to the vehicle, an auxiliary running surface connected to a pavement surface of the traffic lane by a gently sloping ramp perpendicular to the direction of traffic;

said dedicated U-shaped gutter configured to receive a pair of lateral wheels of said vehicle;

said pair of lateral wheels being equipped with at least one retractable roller mounted on a support arm articulated to a stub axle of the front wheel of said pair of lateral wheels;

the method comprising the following steps:

To enter:

1. Extending downward said retractable roller, such that its lowest contact point, in the lowered position, is at the same level as the lowest contact point of the tire of said front wheel;
2. Laterally steering the vehicle toward said dedicated U-shaped gutter, allowing said pair of lateral wheels to gently ascend said sloping ramp;
3. Continuing lateral movement until the centerline of said pair of lateral wheels is vertically aligned with the centerline of said dedicated U-shaped gutter, with said retractable roller temporarily bearing the load of said front wheel by rolling onto said auxiliary running surface;
4. Retracting upward said retractable roller to vertically place said pair of lateral wheels onto said running surface, To exit:

1. Extending downward said retractable rollers to contact and roll onto said auxiliary running surface, thereby unloading said pair of lateral wheels from said running surface;
2. Further extending downward said retractable rollers to lift said front wheel such that its lowest contact point reaches the level of said auxiliary running surface;
3. Steering the vehicle away from said dedicated U-shaped gutter;
4. Continuing lateral movement until said pair of lateral wheels fully engages with said sloping ramp and gently descends onto the pavement surface of the traffic lane;
5. Retracting upward said retractable roller to restore clearance relative to the vehicle's minimum ground clearance.

7. A method according to claim 6, where at least said pair of lateral wheels are equipped with variable-height suspensions, wherein:

during entry, in step 2, the suspension height of said pair of lateral wheels decreases simultaneously with the climbing of said sloping ramp, and in step 4, increases simultaneously with the retraction of said retractable roller;

during exit, in step 2, the suspension height of said pair of lateral wheels decreases simultaneously with the downward extension of said retractable roller, and in step 4, increases simultaneously with the descent of said sloping ramp.

\* \* \* \* \*